United States Patent [19]
Huguenin et al.

[11] Patent Number: 5,655,938
[45] Date of Patent: Aug. 12, 1997

[54] VARIABLE BUOYANCY BALLAST AND FLOTATION UNIT FOR SUBMERGED OBJECTS OR STRUCTURES

[76] Inventors: John E. Huguenin, 49 Oyster Pond Rd., Falmouth, Mass. 02540; Michael D. Willinsky, 2269 Constance Dr., Oakville, Ontario, Canada, L6J 5L8; Andrew S. Billings, 4 Edgerton Dr., N. Falmouth, Mass. 02556

[21] Appl. No.: 420,977

[22] Filed: Apr. 11, 1995

[30] Foreign Application Priority Data

Apr. 11, 1994 [CA] Canada ................... 2120968

[51] Int. Cl.$^6$ ........................................ B63B 22/20
[52] U.S. Cl. ............................................... 441/29
[58] Field of Search ................... 114/45, 74 A, 114/74 R, 121, 353, 125, 315; 441/78, 45, 29

[56] References Cited

U.S. PATENT DOCUMENTS

| | | | |
|---|---|---|---|
| 3,707,937 | 1/1973 | Liles | 114/74 R |
| 4,510,877 | 4/1985 | Bloxham | 114/45 |
| 4,763,592 | 8/1988 | Russ | 114/45 |

FOREIGN PATENT DOCUMENTS 2174054  10/1986  United Kingdom ............... 441/28

*Primary Examiner*—Stephen Avila

[57] ABSTRACT

A variable buoyancy float/ballast assembly has control means allowing it to sink otherwise floating objects and bring sunken objects to the surface or control their placement in the water column. The assembly can be employed to tension mooring lines, reduce vertical uploads on anchors and dampen mooring line transients.

7 Claims, 3 Drawing Sheets

VARIABLE BUOYANCY BALLAST AND FLOTATION UNIT FOR SUBMERGED OBJECTS OR STRUCTURES

FIELD OF THE INVENTION

This invention relates to variable and controllable flotation and ballast devices for positioning objects within a volume of water, tensioning mooring lines and recovery submerged objects. More particularly it relates to a remotely controllable combination float/ballast assembly which serves as a variable buoyancy unit for use in positioning submerged objects or structures, such as instrument packages or apparatus used in the raising of marine stock including fish and shellfish in their natural environment, within a body of water.

BACKGROUND TO THE INVENTION

In the field of aquaculture, various systems have been employed for mooring fish cages and shell-fish frames within the marine environment. Examples of U.S. patents addressing this issue are:

U.S. Pat. Nos. 4,244,323 to Morimura 4,610,219 to Morimura 4,716,854 to Bourdon 4,744,331 to Whiffin 4,747,369 to Gotmalm 4,936,253 to Otamendi-Busto 5,007,376 to Loverich et al.

The raising of fish and other marine life in this environment often requires that the submerged cage or frame associated with the marine life be raised to the surface, and then repositioned in the depths. This is done to carry-out maintenance on the structures, or to harvest the marine life being cultivated.

A need exists for a system for raising and lowering such bodies within the sea or body of water where they are located. A need for a similar positioning means exists in fields other than aquaculture, when any body is to be positioned, or repositioned, under water.

Positioning objects in the water column, whether the objects are positively or negatively buoyant, is usually done through the proper design and deployment of the mooring system. This approach works but is not very precise and cannot compensate for deployment positioning errors and changes that occur with time (losses of buoyancy due to water absorption or biofouling as examples).

Tensioning of mooring lines is usually done with properly placed, fixed weights or floats, but again these cannot be adjusted after deployment. Recovery of objects from the bottom is usually done with lift bags (open bottom air bubbles) and salvage pontoons. Where air volume changes with depth, these may be called "soft tanks". These devices work but usually require diver support and are difficult to control due to buoyancy changes when changing depth. This results in rapidly increasing rates of ascent or descent.

"Hard tanks" where the volume of gas providing the buoyancy does not change with depth are much easier to control, since the buoyancy is constant. Hard buoyancy spheres made of metal or glass are very common and used for this reason. However, they are not readily adjustable and are usually relatively heavy due to structural requirements on the walls that bear high pressure differentials.

A need exists for a flotation/ballast assembly or variable buoyancy unit whose buoyance is controllable and whose features provide flexibility in raising or sinking an object within a column of water.

A further requirement for such a system is an ability to right itself and break-free from a muddy bottom. The invention hereafter described is intended to address these objectives.

The invention in its general form will first be described, and them its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to a broad aspect of the invention, an unmanned variable combination float and ballast assembly for positioning an object immersed or floating with a body of water is provided that comprises:

(a) an air source with an air source valve and air source control means for providing air under pressure;

(b) a floodable air containment chamber for receiving air provided from the air source;

(c) a vent for releasing air from said chamber and vent control means for operating said vent;

(d) water passage means with a water valve and water valve control means for permitting water to enter and flood said chamber when air is released therefrom and to be purged from the chamber when air is introduced therein;

(e) ballast means connected to said air containment chamber, the ballast weight and chamber volume being selected to provide the assembly with a range of positive and negative buoyancy in response to the flooding and purging of said chamber by water;

(f) connection means for attaching lines externally to said assembly;

the air source, vent and water valve control means all being controllable whereby such assembly can be coupled through the connection means to an immersed object to raise and submerge such object within a column of water in a controlled manner. Through actuation of a water control valve provided with the water passage means the assembly can operate in both "hard tank" and "soft tank" modes, providing improved buoyancy control to the assembly. This is an alternative to adjusting the air pressure in the air containment chamber to maintain a constant air volume with changes in depth.

A single variable buoyancy float/ballast assembly according to the invention unit can, with adjustment of attachable ballast weights be used to provide either positive or negative buoyancy. Preferably, the floatation section is a "hard" tank that may be spherical in shape, but could equally well be cylindrical or ellipsoidal. It need not be especially strong as the chamber need be subject only to modest pressure differentials, e.g. in a range of 0 to 100 psi. The float section may be dewatered with compressed air supplied from an on-board tank, by a line from the surface or by an umbilical following a mooring line. Through the control of air inlet and air venting valves and, optionally, by controlling water flooding through the water valve, an unstable acceleration during ascent or descent can be prevented and nearly constant buoyancy with depth can be achieved over a range of depths.

Controls can be effected by an umbilical connection, remotely by sonar or other telemetry, or by onboard preprogrammed instructions.

The invention is suited to use where the submerged object is negatively buoyant. In the case of a positively buoyant aquaculture structure there is preferably provided at least two mooring lines extending from said structure to respective anchors, the flotation assemblies being positioned and connected to said mooring lines at connection points intermediate said object and anchors, wherein said connection points and the lengths of said mooring lines permit the structure to either be submerged or raised to the surface with the mooring lines in either case being substantially free from slackness when finally positioned.

Preferably the connection means are provided at the top, central and lower portions of the assembly.

This invention combines the advantages of a "hard tank" with an adjustable and controllable buoyancy feature. It does not require diver assistance nor does it have the structural weight penalty of a fixed hard tank. This is due to the controllability aspect, which enables the unit to act as a "hard tank" over only a limited range of pressure differentials across the wall (hull). If the assembly exceeds the allowable depth excursion without compensating commanded changes, over-pressure relief safety valves may activate allowing the unit to revert to the behaviour of a "soft tank".

This unit can be used to submerge a floating buoyant object to sufficient depth to avoid effects of major storms, or for any other reason, and later return it to the surface. This capability can also provide protection from surface ice, debris or boat traffic and security from poachers, thieves, and vandals. The unit can be scaled-up and a number can be used together. The buoyantly controlled object could include such items as aquaculture facilities, research/weather stations, maritime loading/unloading docks/facilities, military bases and landing/servicing/refuelling/takeoff facilities for aircraft. The object may be negatively buoyant, being kept from sinking by the variable buoyancy unit, as well as being positively buoyant, and subject to submergence by the variable buoyancy unit.

By a further feature of the invention, the air chamber may be provided with an internal flexible membrane to allow functioning of the system independently of the orientation of the unit by assuring separation of the air and water. Such a membrane can serve to permit purging of water from the air containment chamber, even when the assembly is tipped to place the water passage means above the volume of contained air.

The unit is highly configurationally flexible due to the provision of top, middle and bottom attachment points. It can be used as a float or sinker in a mooring system. It can be used to submerge and raise a buoyant fish cage or shellfish rack or other object from the bottom to the surface.

When used as a sinker on a mooring securing a positively buoyant component, the variable buoyancy unit can substantially unload the anchor portion of the mooring system by substantially reducing the "up" forces at the anchor. This can, in many circumstances, markedly reduce anchor size, weight and cost. Since mooring costs can be a major part of overall systems costs, the savings associated with employment of variable buoyancy units can be very significant.

The unit can also serve an important role in a mooring system by acting as a "spring" or "shock absorber" in deflecting the run of a mooring line from its normal curvature. The absorption of shock is often conventionally done using elastic cables which stretch, or heavy anchor chain which form a catenary curvature when lifted off of the bottom. This unit does the same thing with much less change in mooring line length than "stretchy" line and less change in vertical down loads on buoyant components than a heavy chain catenary system.

The shock "absorber" effect may be further aided by the assembly acting as a spring in a mooring when one line is connected at the top and the other at the bottom of the unit so that the portions of the mooring liens are not collinear to each other as their points of attachment. The shock absorber effect is due to the wide separation of the centers of mass and buoyancy of the unit and the resulting tendency of the assembly to resistively rotate when the load on the mooring line is increased. This feature is very effective in damping transient loads and further reducing the possibility of undue slack developing in a mooring line.

A separate air control valve and air line can be used to distribute air under pressure at the very base of the assembly, providing an air scouring capability. When objects rest on the bottom of the ocean they can penetrate into the bottom and often get partially sedimented in. Breakout forces required to overcome these bottom effects (dead weight of sediments and suction effects) can be many times the lift forces required to lift the object clear of the bottom once released. Air scouring reduces this potential problem for the unit by breaking suctions and fluidizing sediments around the base of the assembly. If the water passageway is provided with an exit portion from the chamber that is routed to the base of the assembly, the hydraulic scouring effect of water being purged under pressure can further assist in reducing breakout forces.

One or more variable buoyancy units working together can be operated as an underwater hoist, by a diver using a water-proof control box attached to the assembly by a short umbilical. The diver is preferably in visual contact with the unit and object to be moved, but positioned at a safe distance. By use of multiple assemblies that are appropriately moored an attached object can be easily raised, moved laterally, aligned and carefully lowered in place.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
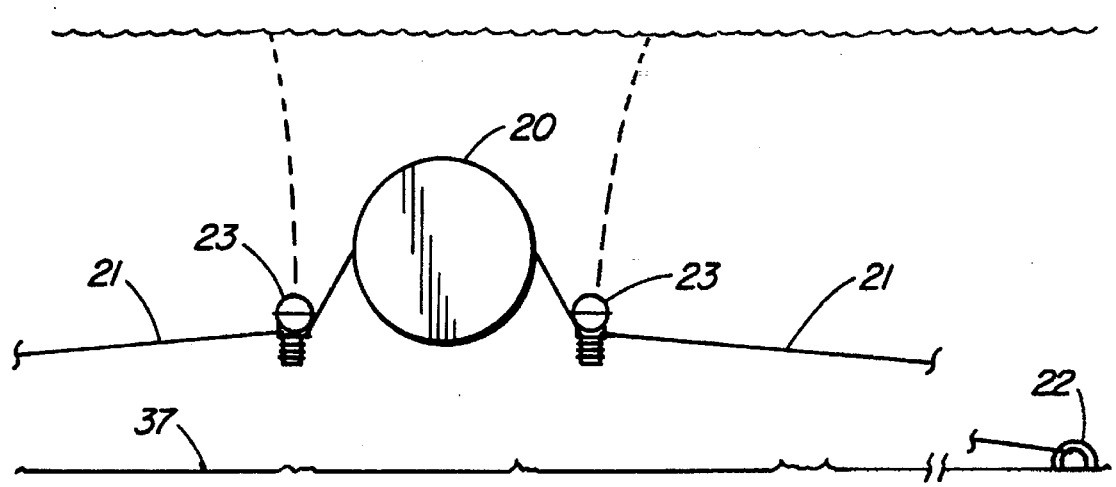
FIG. 1 is a schematic of the variable buoyancy unit of the invention controlling the position of a positively buoyant object namely a fish cage moored to the ocean floor.

In FIG. 1 a fish cage 20, or other buoyant object, is moored by two lines 21 to anchors 22. The variable buoyancy float 23 or float/ballast assembly 23 of the invention is incorporated into the mooring lines at two points on either side of the cage 20. The cage or object 20 itself preferably has a positive buoyancy which will allow it to float on the surface with some of its volume above water. However, objects having negative buoyancy within the lifting capacity of the float/ballast assembly may equally be manipulated by the invention.

Figure 2:
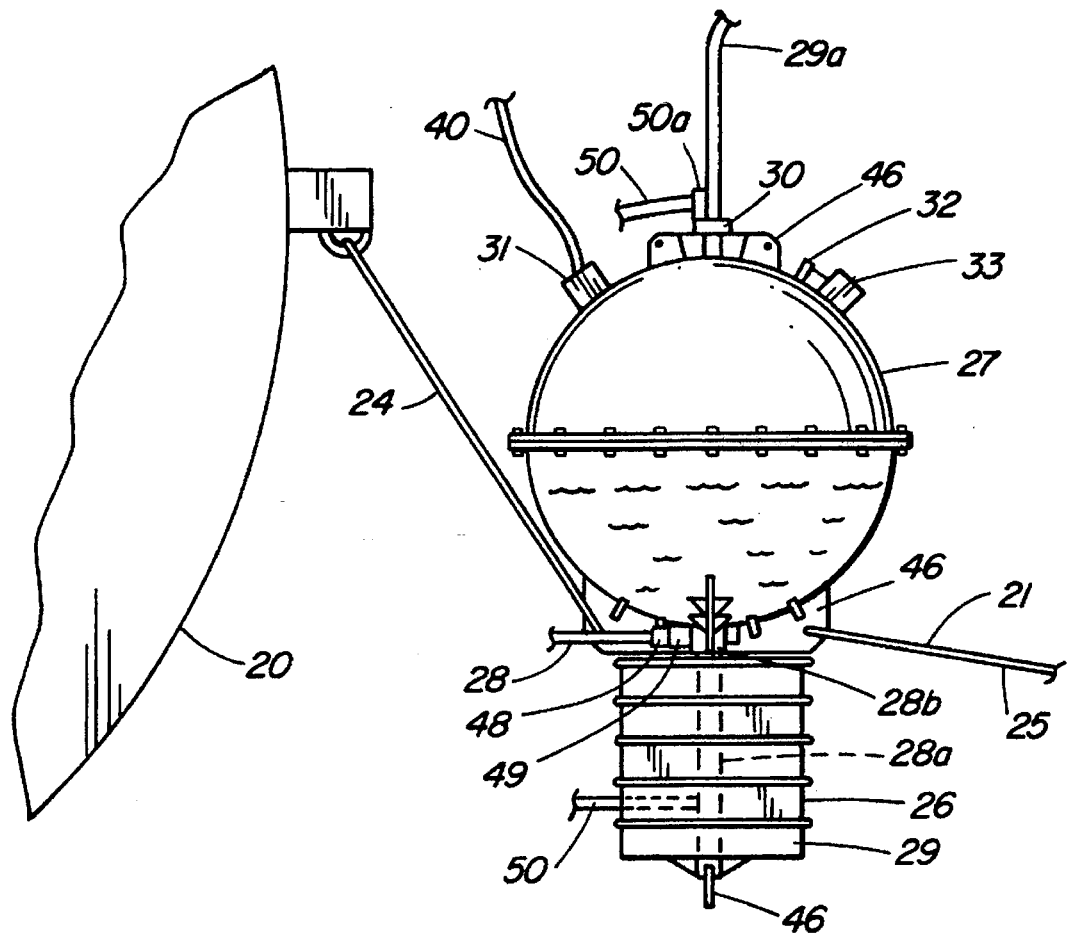
FIG. 2 is a detail showing the features of the variable buoyancy unit and one possible arrangement for the line attachments between the buoyancy assembly and an object such as shown in FIG. 1.

The details of attachment of the float/ballast assembly 23 are shown in FIG. 2 wherein the mooring line 21 is divided into two segments, a portion 24 proximate to the cage or object 20 extending to the float assembly; and a distal portion 25 extending from the float 23 to the anchor 22. These will be referred to as the proximal link 24 and distal portion 25 of the mooring line 21. They are both connected to the assembly 23 at plates with eyelets therein that serve as connection means 46.

The float/ballast assembly 23 has a lower ballast portion 26 that carries fixed but adjustable ballast in modular increments. The ballast material may be made of concrete, steel or other suitable material. The assembly 23 also has a floatation chamber 27, preferentially in the form of a rigid sphere or other shape. This chamber 27 has a lower passageway and water entry opening 28 and water valve with water valve control means 48, 49 which permits water to enter or be expelled from the chamber 27. If the water inlet and outlet are separated, a lower water scouring passageway exit opening 28a commencing from a water exit valve, 28b may extend to the bottom of the ballast portion 26 to help break the assembly free from mud when flotation is required. Activated by the water valve control means 49 the release of water, followed by air, through the water scouring passageway 28a will provide assistance in breaking any suction effects present. Alternately or additionally, a separate air line 50 with air scouring valve 50a may lead from the air supply 29 to the bottom of the assembly 23 to provide direct air scouring as required.

Associated with the floatation chamber 27 is a source of compressed air from which air may enter the chamber 27 to expel water and raise its buoyancy. This may be an external tank 29 of compressed air optionally located within the ballast stack of the assembly, an internal tank (not shown) of compressed air located within the chamber 27, or an air hose that leads to the surface. The air enters through a valve 30 that is controlled by a valve controller 31 operated remotely as by an electrical cable 40, radio transmissions or equivalent communication means. This and other valves may also be air activated as for example by being toggled between open and closed states by applied air pressure. The floatation chamber 27 is also provided with an air vent opening 32, similarly controlled by an air vent controller 33.

When the chamber 27 is fully flooded, the assembly 23 will sink. When filled with air, the assembly will float. The size of the ballast portion 26 and floatation chamber 27 are selected to provide the requisite weight to sink the object 20 and allow the object 20 to be raised to the surface.

Figure 3:
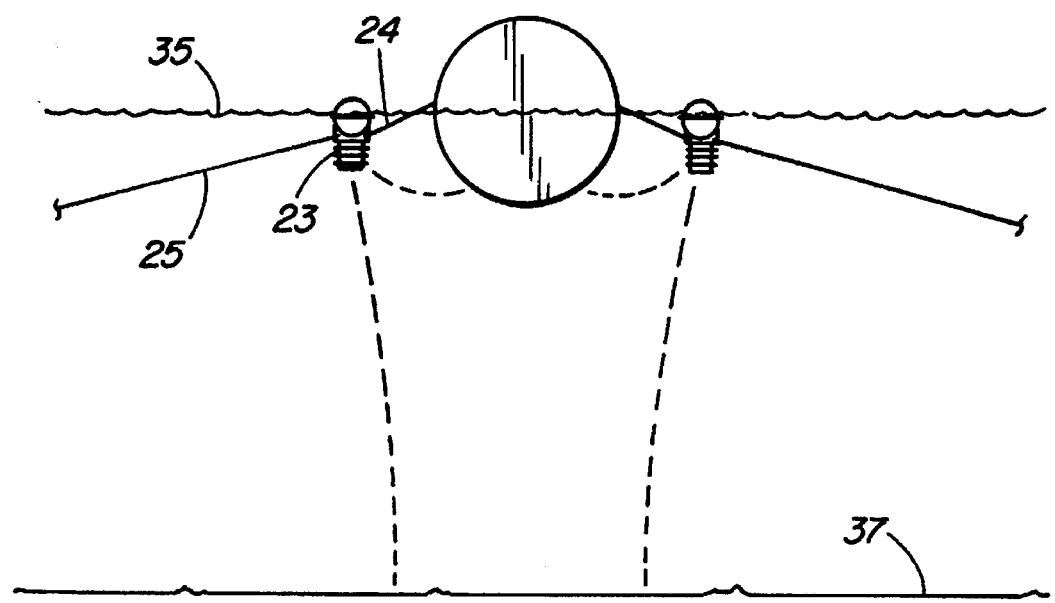
FIG. 3 is a schematic of the moored fish-cage raised to the surface.

The lengths of the proximal link 24 and distal portion 25 of each mooring line 21 and the positions of the anchors 22, are chosen to permit the cage 20 to rise fully to the surface 35 with minimal slack present in the lines 21. This condition is shown at an ideal limiting form in FIG. 3 where the proximal links 24 and distal portions 25 are shown as being co-linear at the surface, the variable buoyancy unit 23 having followed the path of an arc centered about the anchor point 22 while rising from the bottom 37. This arrangement will localize the cage 20 in a specific area when it is raised.

Figure 4:
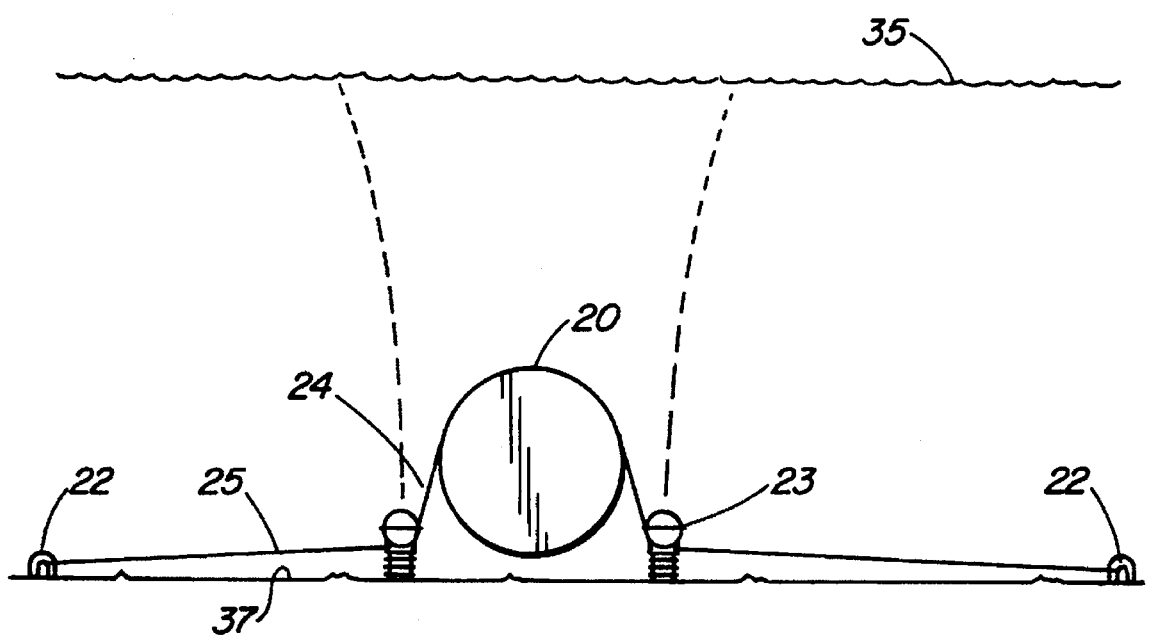
FIG. 4 is a schematic of the moored fish-cage sunk to the ocean bottom.

It is desirable for all sections of the mooring lines 21 to be similarly taut when the cage 20 is fully submerged. This is shown in FIG. 4 wherein the relative lengths of the proximal links 24 and distal portions 25 of the mooring lines 21 are selected to achieve this effect at a specific depth. In this manner, the cage 20 can be held substantially at a single location on the ocean floor 37, once sunk.

Although two mooring lines 21 are depicted, three or more may be similarly employed to provide for increased lateral precision in the placement of the object 20.

By operating the air valve and vent controllers 31, 33 to purge water from the chamber 27, the object 20 can be raised to the surface 35 for maintenance, and repositioned on the ocean floor 37 at a depth that is beyond the disturbance of surface effects.

Figure 5:
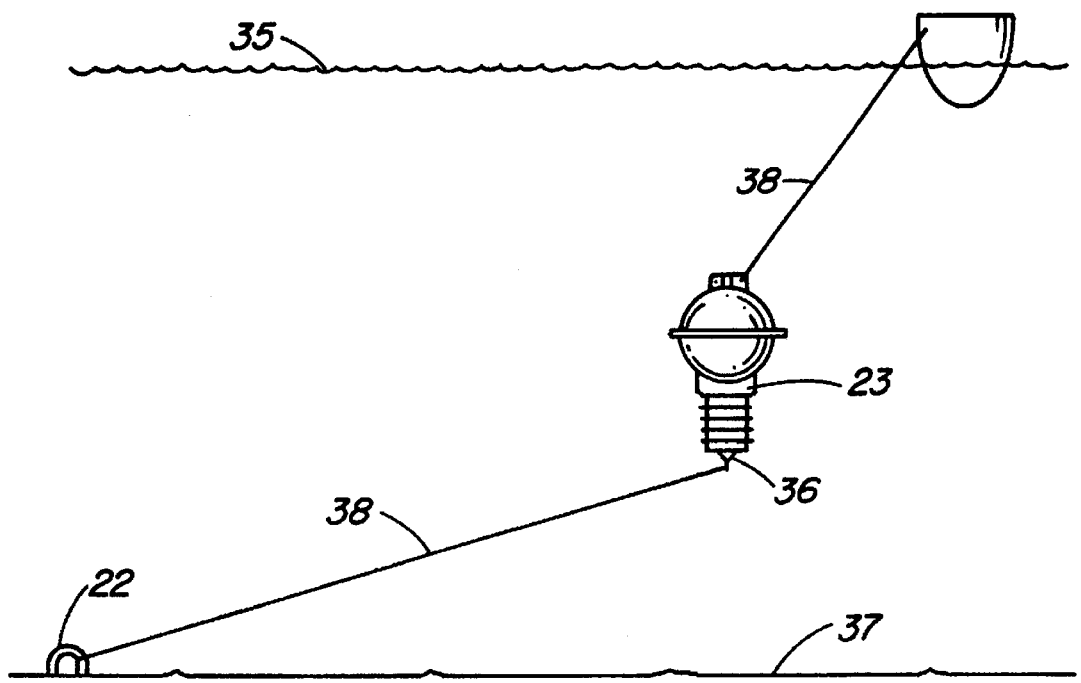
FIG. 5 is a schematic of the variable buoyancy assembly used on a regular mooring line.

The float/ballast assembly 23 may also be employed as shown in FIG. 5 as a "sinker" or underwater "float" in other applications where it is intended to position a point 36 in a line 38 extending from the surface 35 to an anchor 22 on the ocean floor 37. In such a position, the assembly 23 can moderate the motion of the line 38, performing part of the functions of a shock-absorber by displacing the line 38 from its normal curvature. In such application the unit 23 may be positively or negatively buoyant. It may apply an upwards force, or it may serve as a sinker to lower the angle at which the line 38 approaches the anchor 22. This reduces the lifting force on the anchor 23, improving its holding power.

This moderating effect can be enhanced by attaching the lines 38 to the assembly 23 as points whereby the forces being applied to the assembly 23 are not coincident. The twisting forces of the lines is resisted by the spacing between the ballast 26 and chamber 27 which separates the centers of buoyancy and of gravity for the assembly 23. By separating the points of attachment so that the lines of force applied by the respective mooring lines 38 are not coincident, the assembly 23 will soften applied shocks by swivelling.

The float/ballast assembly can also serve as a controllable underwater lifting device for use by divers.

Figure 6:
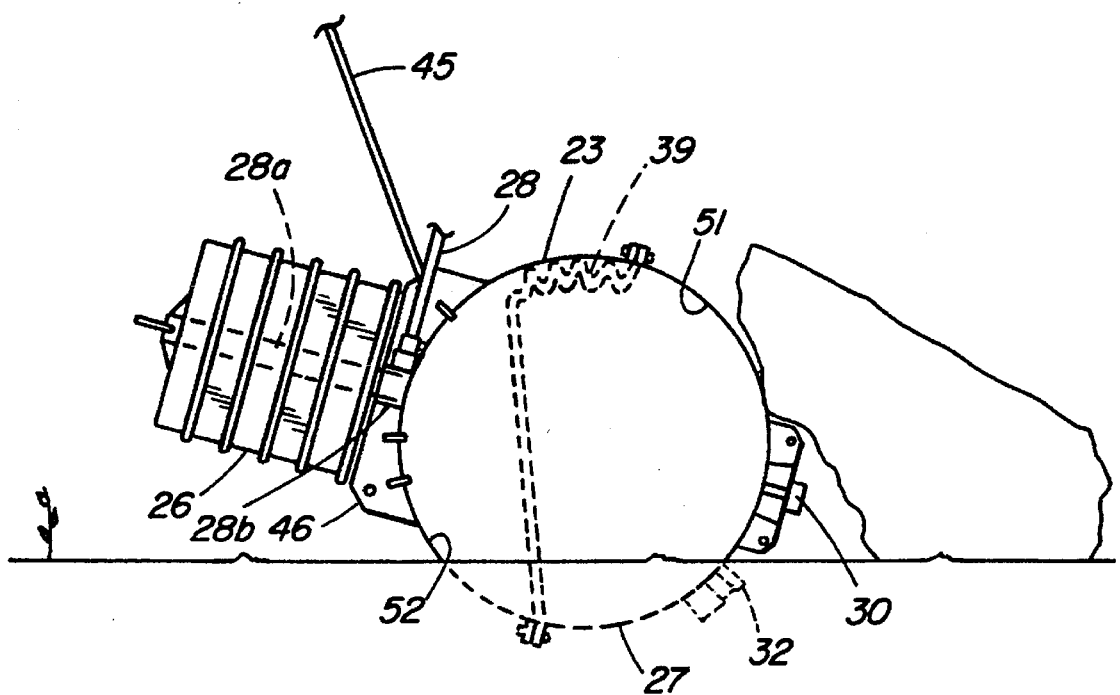
FIG. 6 is a schematic of a tipped buoyancy assembly having an inner air/water separation membrane.

The float/ballast assembly 23 may be provided with a bladder or membrane 39 to contain air within the flotation chamber 27. As shown in FIG. 6, the bladder membrane 39 divides the chamber 27, excluding water from access to both the air valve 30 and vent 32. Concurrently, air cannot escape through the water passageway 28. With such a bladder 39 present, a tipped or inverted assembly 23 with its water outlet 28 located above the volume of air in the chamber 23 will not exhaust all of its air supply in a futile attempt to purge the chamber 23 of water and achieve buoyancy. Rather the expanding membrane 39 will force the water out through the water passageway 28. In such cases, the assembly can, under most conditions, right itself; or it can be righted by use of lines 45.

The bladder membrane 39 is preferably fitted centrally to traverse the central plane of the chamber 27 and be attached at the "equator" of the chamber 27 if spherical. Such membrane 39 should be sufficiently slack to be displaceable to either of the upper 51 or lower 52 inner surfaces of the chamber 27.

With such a bladder membrane 39 displaced to the lower inner surface 52, a modest positive over-pressure condition may be created within the assembly 23. Over-pressures of up to on the order of 100 psi can be contained without including elaborate strengthening features for the chamber 27.

With the volume of air in the chamber 27 kept constant by closure of the air, vent and water valves, the underwater effective weight or buoyancy of the assembly 23 will not, over a range, vary with changes in depth. Thus, upon descending, within the range that the chamber 27 can support a pressure differential, the assembly 23 will not tend to accelerate as it descends in a column of water. Nor will it similarly accelerate if operated in ascending mode.

While the foregoing exemplary embodiments have made reference to a fish cage, any type of object or structure of suitable buoyancy may be similarly controlled and manipulated within water. Preferably, such object should be naturally buoyant, although this is not essential. If such buoyancy is excessive and beyond the sinking capacity of the ballast assembly itself, additional external adjusting ballast may be attached to the object to be manipulated. Similarly a heavy object may be lightened by external fixed buoyancy tanks to place it within range of manipulation by the variable buoyancy unit of the invention.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed as follows:

1. An unmanned, controllable, combination float and ballast assembly for positioning an immersed or floating object within a body of water comprising:
   (a) an air source with an air source valve and air control means for providing air under pressure;
   (b) a floodable air containment chamber for receiving air provided from the air source;
   (c) a vent for releasing air from said chamber and vent control means for operating said vent;
   (d) water passage means with a water valve and water valve control means for permitting water to enter and flood said chamber when air is released therefrom and to be purged from the chamber when air is introduced therein;
   (e) ballast means connected to said air containment chamber, the ballast weight and chamber volume being selected to provide the assembly with a range of positive and negative buoyancy in response to the flooding and purging of said chamber by water;
   (f) connection means for attaching lines externally to said assembly; and
   (g) scouring means positioned on said assembly to provide scouring to overcome breakout forces created due to settling when the assembly is sitting on the bottom of the body of water, the air source, vent and water valve control means all being controllable whereby such assembly can be coupled through the connection means to an immersed object to raise and submerge such object within a column of water in a controlled manner that permits a controlled rate of ascent or descent.

2. An assembly as in claim 1 wherein said scouring means comprises an air scouring release valve and air conduit to distribute air under pressure at the base of the assembly beneath the ballast to provide an air scouring capability.

3. An assembly as in claim 1 wherein said scouring means comprises a water purging orifice located at the base of the assembly beneath the ballast so that purging water may be passed-out through this orifice and provide water scouring capability.

4. An unmanned, controllable combination float and ballast assembly for positioning an immersed or floating object within a body of water in combination with such object, said object being attached to a mooring line through said assembly, said assembly comprising:
   (a) an air source with an air source valve and air control means for providing air under pressure;
   (b) a floodable air containment chamber for receiving air provided from the air source;
   (c) a vent for releasing air from said chamber and vent control means for operating said vent;
   (d) water passage means with a water valve and water valve control means for permitting water to enter and flood said chamber when air is released therefrom and to be purged from the chamber when air is introduced therein;
   (e) ballast means connected to said air containment chamber, the ballast weight and chamber volume being selected to provide the assembly with a range of positive and negative buoyancy in response to the flooding and purging of said chamber by water; and
   (f) connection means for attaching a mooring line externally to said assembly;

the air source, vent and water valve control means all being controllable whereby such assembly can be raised and submerged within a column of water in a controlled manner, the assembly having centers of mass and buoyancy that are separated, there being present a mooring line with one portion thereof connected at one first point on the assembly and another portion of said mooring line being connected on the assembly at a second point spaced from said first point to provide for the assembly to resist shock applied to the mooring line by the rotation of the assembly.

5. A sinkable floating object in combination with two float and ballast assemblies coupled thereto, each of said assemblies comprising:
   (a) an air source with an air source valve and air control means for providing air under pressure;
   (b) a floodable air containment chamber for receiving air provided from the air source;
   (c) a vent for releasing air from said chamber and vent control means for operating said vent;
   (d) water passage means with a water valve and water valve control means for permitting water to enter and flood said chamber when air is released therefrom and to be purged from the chamber when air is introduced therein;
   (e) ballast means connected to said air containment chamber, the ballast weight and chamber volume being selected to provide the assembly with a range of positive and negative buoyancy in response to the flooding and purging of said chamber by water; and
   (f) connection means for attaching lines externally to said assembly;

the air source, vent and water valve control means of each assembly all being controllable whereby said assemblies can be utilized to raise and submerge said object within a column of water in a controlled manner that permits a controlled rate of ascent and descent, there being further provided two sections of mooring line extending respectively from the immersed object to respective anchors, the two assemblies being respectively positioned and connected to said mooring lines at connection points intermediate said object and said respective anchors, wherein said connection points and the lengths of said mooring lines permit the object to either be submerged or raised to the surface with the mooring lines in either case being substantially free from slackness when finally positioned.

6. In a mooring system, an unmanned controllable combination float and ballast assembly for positioning an immersed or floating object attached to a mooring line within a body of water comprising, in combination with said object:

(a) an air source with an air source valve and air control means for providing air under pressure;

(b) a floodable air containment chamber for receiving air introduced from the air source to provide a volume of air within said chamber;

(c) a vent for releasing air from said chamber and vent control means for operating said vent;

(d) water passage means with a water valve and water valve control means for permitting water to enter and flood said chamber when air is released therefrom and to be purged from the chamber when air is introduced therein:

(e) ballast means connected to said air containment chamber, the ballast weight and air chamber volume being selected to provide the assembly, in combination with said object, with a range of positive and negative buoyancy in response to the flooding and purging of said chamber by water; and (f) external connection means attaching said assembly to said object;

the air, vent and water valve control means all being controllable whereby such assembly can raise and submerge such object within a column or water in a controlled manner that permits a controlled rate of ascent or descent to thereby serve as a float or sinker within said mooring system.

7. An assembly as in claim 6 wherein said object is totally submerged.

* * * * *